(12) United States Patent
McQuade

(10) Patent No.: US 7,369,043 B2
(45) Date of Patent: May 6, 2008

(54) METHOD AND APPARATUS FOR AUTOMATICALLY IDENTIFYING THE LOCATION OF PRESSURE SENSORS IN A TIRE PRESSURE MONITORING SYSTEM

(75) Inventor: Thomas M. McQuade, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 10/908,430

(22) Filed: May 11, 2005

(65) Prior Publication Data

US 2006/0259214 A1    Nov. 16, 2006

(51) Int. Cl.
B60C 23/00    (2006.01)
(52) U.S. Cl. .................... 340/445; 340/447; 701/32
(58) Field of Classification Search ........ 340/445–448; 73/146.2–146.5; 701/29, 32, 35
See application file for complete search history.

(56) References Cited

U.S. PATENT DOCUMENTS

| | | | |
|---|---|---|---|
| 1,948,427 A | 2/1934 | Moecker | |
| 1,954,153 A | 4/1934 | Taylor | |
| 2,274,557 A | 2/1942 | Morgan et al. | |
| 2,578,358 A | 12/1951 | Jellison | |
| 2,589,623 A | 3/1952 | Merritt et al. | |
| 3,852,717 A | 12/1974 | Hosaka et al. | |
| 3,911,855 A | 10/1975 | Haven | |
| 3,965,847 A | 6/1976 | Deming | |
| 3,974,477 A | 8/1976 | Hester | |
| 4,051,803 A | 10/1977 | Arnone | |
| 4,316,176 A | 2/1982 | Gee et al. | |
| 4,376,931 A | 3/1983 | Komatu et al. | |
| 4,443,785 A | 4/1984 | Speranza | |
| 4,494,106 A | 1/1985 | Smith et al. | |
| 4,510,484 A | 4/1985 | Snyder | |
| 4,574,267 A | 3/1986 | Jones | |
| 4,742,476 A | 5/1988 | Schwartz et al. | |
| 5,061,917 A | 10/1991 | Higgs et al. | |
| 5,109,213 A | 4/1992 | Williams | |
| 5,463,374 A | 10/1995 | Mendez et al. | |
| 5,517,853 A | 5/1996 | Chamussy | |
| 5,569,848 A | 10/1996 | Sharp | |
| 5,583,482 A | 12/1996 | Chamussy et al. | |
| 5,587,698 A | 12/1996 | Genna | |
| 5,589,815 A | 12/1996 | Nishihara et al. | |
| 5,600,301 A | 2/1997 | Robinson, III | |
| 5,602,524 A | 2/1997 | Mock et al. | |
| 5,612,671 A | 3/1997 | Mendez et al. | |
| 5,656,993 A | 8/1997 | Coulthard | |
| 5,661,651 A | 8/1997 | Geschke et al. | |
| 5,717,376 A | 2/1998 | Wilson | |
| 5,721,528 A | 2/1998 | Boesch et al. | |

(Continued)

Primary Examiner—Thomas Mullen
(74) Attorney, Agent, or Firm—Gary Smith

(57) ABSTRACT

A tire pressure monitoring system (12) for a vehicle (10) has a plurality of tires (14A-D) in respective rolling locations having a respective plurality of tire transmitters (16A-D) that generate a respective plurality of transmitter identification signals. A respective plurality of initiators (20A-D) are fixedly attached to the vehicle at a respective plurality of locations. The initiators may include orthogonal coils (112, 114). A controller (22) activates the plurality of initiators using the coils (112, 114) and receives a plurality of respective sensor signals having respective tire identifications. The activations may occur with a duty cycle of less than about fifty percent.

19 Claims, 3 Drawing Sheets

U.S. PATENT DOCUMENTS

| | | |
|---|---|---|
| 5,741,966 A | 4/1998 | Handfield et al. |
| 5,790,016 A | 8/1998 | Konchin et al. |
| 5,801,306 A | 9/1998 | Chamussy et al. |
| 5,808,190 A | 9/1998 | Ernst |
| 5,838,229 A | 11/1998 | Robinson, III |
| 5,853,020 A | 12/1998 | Widner |
| 5,880,363 A | 3/1999 | Meyer |
| 5,913,240 A | 6/1999 | Drähne et al. |
| 5,926,087 A | 7/1999 | Busch et al. |
| 5,939,977 A | 8/1999 | Monson |
| 5,959,202 A | 9/1999 | Nakajima |
| 5,963,128 A | 10/1999 | McClelland |
| 5,965,808 A | 10/1999 | Normann et al. |
| 5,969,239 A | 10/1999 | Tromeur et al. |
| 5,990,785 A | 11/1999 | Suda |
| 5,999,091 A | 12/1999 | Wortham |
| 6,002,327 A | 12/1999 | Boesch et al. |
| 6,034,597 A | 3/2000 | Normann et al. |
| 6,043,738 A | 3/2000 | Stewart et al. |
| 6,046,672 A | 4/2000 | Pearman |
| 6,078,252 A | 6/2000 | Kulczycki et al. |
| 6,111,520 A | 8/2000 | Allen et al. |
| 6,118,369 A | 9/2000 | Boesch |
| 6,161,071 A | 12/2000 | Shuman et al. |
| 6,199,575 B1 | 3/2001 | Widner |
| 6,204,758 B1 | 3/2001 | Wacker et al. |
| 6,218,936 B1 | 4/2001 | Imao |
| 6,225,895 B1 | 5/2001 | Bigelow, Jr. |
| 6,232,875 B1 | 5/2001 | DeZorzi |
| 6,246,317 B1 | 6/2001 | Pickornik et al. |
| 6,259,361 B1 | 7/2001 | Robillard et al. |
| 6,271,748 B1 | 8/2001 | Derbyshire et al. |
| 6,275,148 B1 | 8/2001 | Takamura et al. |
| 6,275,231 B1 | 8/2001 | Obradovich |
| 6,278,363 B1 | 8/2001 | Bezek et al. |
| 6,278,379 B1 | 8/2001 | Allen et al. |
| 6,292,096 B1 | 9/2001 | Munch et al. |
| 6,293,147 B1 | 9/2001 | Parker et al. |
| 6,327,570 B1 | 12/2001 | Stevens |
| 6,339,736 B1 | 1/2002 | Moskowitz et al. |
| 6,369,703 B1 | 4/2002 | Lill |
| 6,385,511 B1 | 5/2002 | Fondeur et al. |
| 6,446,502 B1 | 9/2002 | Normann et al. |
| 6,448,891 B2 | 9/2002 | Barnett |
| 6,448,892 B1 | 9/2002 | Delaporte |
| 6,453,737 B2 | 9/2002 | Young et al. |
| 6,463,798 B2 | 10/2002 | Niekerk et al. |
| 6,498,967 B1 | 12/2002 | Hopkins et al. |
| 6,518,876 B1 | 2/2003 | Marguet et al. |
| 6,591,671 B2 | 7/2003 | Brown |
| 6,612,165 B2 | 9/2003 | Juzswik et al. |
| 6,631,637 B2 | 10/2003 | Losey |
| 6,667,687 B1 | 12/2003 | DeZorzi |
| 6,672,150 B2 | 1/2004 | Delaporte |
| 6,694,807 B2 | 2/2004 | Chuang |
| 6,700,480 B2 * | 3/2004 | Moore .................... 340/445 |
| 6,745,624 B2 | 6/2004 | Porter |
| 6,750,762 B1 | 6/2004 | Porter |
| 6,771,169 B1 | 8/2004 | Kaminski |
| 6,782,741 B2 | 8/2004 | Imbert |
| 6,784,794 B1 | 8/2004 | McQuade |
| 6,805,000 B1 | 10/2004 | Sheikh-Bahaie |
| 6,838,985 B2 * | 1/2005 | Ghabra et al. .............. 340/445 |
| 6,850,155 B1 | 2/2005 | McQuade |
| 6,900,725 B1 | 5/2005 | Berry |
| 6,952,160 B1 | 10/2005 | Bennie |
| 6,958,685 B2 * | 10/2005 | Desai .................... 340/447 |
| 6,982,636 B1 | 1/2006 | Bennie |
| 6,985,076 B1 | 1/2006 | Bennie |
| 7,026,922 B1 * | 4/2006 | Talukder et al. ........... 340/447 |
| 7,224,269 B2 * | 5/2007 | Miller et al. ................ 340/444 |
| 7,271,709 B2 * | 9/2007 | Miller et al. ................ 340/442 |
| 2002/0008718 A1 | 1/2002 | Obradovich |
| 2004/0172179 A1 * | 9/2004 | Miwa .................... 701/29 |
| 2005/0011257 A1 | 1/2005 | Modawell |
| 2005/0200464 A1 | 9/2005 | Bennie |

* cited by examiner

METHOD AND APPARATUS FOR AUTOMATICALLY IDENTIFYING THE LOCATION OF PRESSURE SENSORS IN A TIRE PRESSURE MONITORING SYSTEM

TECHNICAL FIELD

The present invention relates generally to a tire pressure monitoring system for an automotive vehicle, and more particularly, to a method and system for automatically determining the pressure sensor locations relative to the vehicle.

BACKGROUND OF THE INVENTION

Various types of pressure sensing systems for monitoring the pressure within the tires of an automotive vehicle have been proposed. Such systems generate a pressure signal using an electromagnetic (EM) signal which is transmitted to a receiver. The pressure signal corresponds to the pressure within the tire. When the tire pressure drops below a predetermined pressure, an indicator is used to signal the vehicle operator of the low pressure. Many vehicles require different tire pressures in the front of the vehicle and the rear of the vehicle. Therefore, it is important to know the relative position of the pressure sensor and thus the tires relative to the vehicle. Known systems provide manual means for programming the relative positions. For example, a magnet is positioned manually near the tire to allow the system to recognize the position of the tire. Such systems rely on the vehicle operator performing the recognition in a particular order. Such systems, however, are prone to errors.

Other systems use a device attached to the wheel well that forces the sensor contained in the tire to transmit immediately. A central receiver is used to "hear" the sensor's response to the forcing operation. An initiator is the device used to force the response. The receiver finalizes the auto location by associating the sensor identification with the specific wheel location for which the response is forced.

Known initiators use a low frequency magnetic field as the forcing operation. An electric coil within the sensor senses the magnetic field. Due to the nature of the magnetic fields and regulations set forth by the United States Federal Communications Commission the coil in the sensor does not have sufficient sensitivity to the magnetic field to ensure robust operation.

Current design trends in automotive vehicles provide increased tire size. One solution to the lack of sensitivity is placing the initiator closer to the wheels or tires. However, as the wheel size increases, less space is available for decreasing the distance to the tire. Also, in truck applications the initiator is typically placed far from the sensor. Placing the coil closer to the tire still has not provided adequate performance gain.

The pressure sensors are powered by batteries which are size limited to minimize cost and weight. However, the size limitation also reduces the amount of energy available to power all of the functions, including responding to the sensing of a magnetic field. In order to preserve battery energy, sensors typically do not sense the presence of a magnetic field continuously. Every so often the sensors sample voltage on an electric coil for a very short period of time. Typical time periods are that the sensor samples every four seconds for 250 microseconds. To ensure that the sensor receives the signal, the magnetic field is transmitted for extended periods of time. The problem associated with such a solution is that the United States Federal Communications Commission limits the strength of the field (currently 5.77 nT average field strength at a distance of one meter from the initiator). However, the FCC allows peak field strength to increase by up to 20dB for a device that transmits a field for less than 10ms. Another source of degradation in current solutions is the orientation of the coil in the sensor relative to the electric coil in the initiator. Ideally, the axes of these coils are parallel to ensure maximum coupling. However, the coil in the sensor may be rotated relative to the coil in the initiator as the wheel is turned to turn the vehicle. Misalignments in a locked turn can decrease the amount of power by a factor of 2 (3dB). One solution to this is adding a coil in the sensor orthogonal to the existing coil. As the wheel is turned, the second coil increases its ability to sense the magnetic field. One problem with such a solution is that the package size increases for the addition of the new coil. Because of the design restriction to provide common parts for several vehicles, vehicles that do not require such systems may incur the additional cost and mass increase.

It would therefore be desirable to provide a tire pressure monitoring system that automatically and reliably identifies the position of each tire relative to the vehicle.

SUMMARY OF THE INVENTION

The present invention provides a system and method for automatically identifying the position of the tires relative to the vehicle.

In one aspect of the invention, a tire pressure monitoring system for a vehicle has a plurality of tires in respective rolling locations having a respective plurality of tire transmitters that generate a respective plurality of transmitter identification signals. A respective plurality of initiators are fixedly attached to the vehicle at a respective plurality of locations. A controller activates the plurality of initiators to generate an initiator signal, receives a plurality of respective sensor signals having respective tire identifications and stores the tire identifications in the memory. The initiator signal may be generated from a first coil having a first longitudinal axis and a second coil having a second longitudinal axis substantially orthogonal to the first axis. The initiator signal may also have a duty cycle of less than about 50 percent.

In a further aspect of the invention, a method of operating a tire pressure monitoring system having a plurality of tire locations comprises activating and transmitting a first initiator signal from a first initiator positioned at a first tire location of the plurality of tire locations, said initiator signal being generated from both a first coil having a first longitudinal axis and a second coil having a second longitudinal axis that is substantially orthogonal to the first axis, and said initiator signal having a duty cycle of less than about 50 percent; receiving the first initiator signal with a sensor coil; periodically detecting the presence of an induced electric field on the sensor coil; when an electric field is detected and determined to exist, generating a first sensor signal having a first tire identification in response to the first initiator signal; receiving the first sensor signal; storing the first tire identification as received in a memory associated with the first of the plurality of tire locations when the first tire identification is not in the memory; and similarly repeating the steps of activating, detecting, generating, receiving, and storing for each of the plurality of tire locations.

One advantage of the invention is that no operator intervention is required for the identification, which in one embodiment, may be performed every time the vehicle is running. Also, the orthogonal coils improve energy coupling to the sensor coil.

Other advantages and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
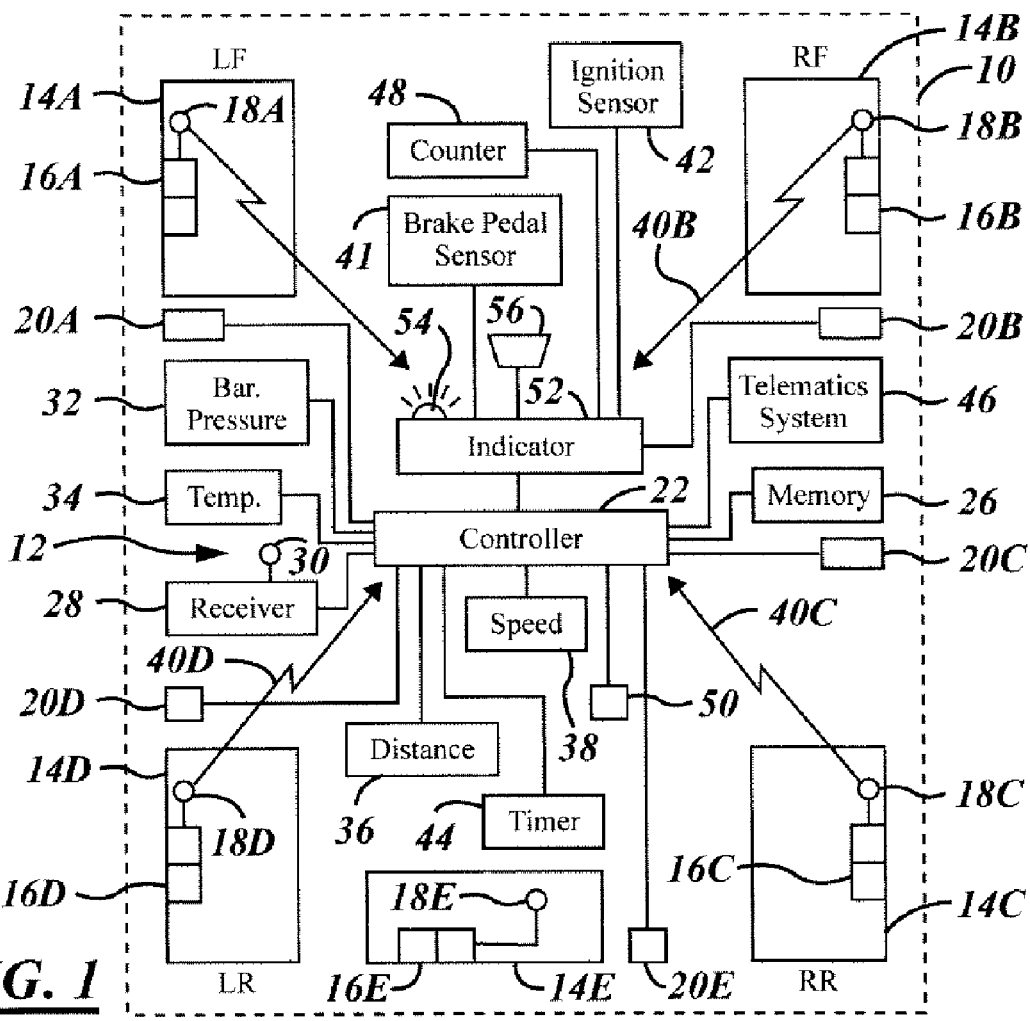
FIG. 1 is a block diagrammatic view of a pressure monitoring system according to the present invention.

In the following figures, the same reference numerals will be used to illustrate the same components. Those skilled in the art will recognize that the various components set forth herein could be changed without varying from the scope of the invention.

Referring now to FIG. 1, an automotive vehicle 10 has a pressure monitoring system 12 for monitoring the air pressure within a left front tire 14a, a right front tire 14b, a right rear tire 14c, and a left rear tire 14d. Each tire 14a-14d has a respective tire pressure sensor circuit 16a, 16b, 16c, and 16d, each of which has a respective antenna 18a, 18b, 18c, and 18d. Each tire is positioned upon a corresponding wheel.

A fifth tire or spare tire 14e is also illustrated having a tire pressure sensor circuit 16e and a respective antenna 18e. Although five wheels are illustrated, the pressure of various numbers of wheels may be increased. For example, the present invention applies equally to vehicles such as pickup trucks that have dual wheels for each rear wheel. Also, various numbers of wheels may be used in a heavy duty truck application having dual wheels at a number of locations. Further, the present invention is also applicable to trailers and extra spares.

Each tire 14 may have a respective initiator 20a-20e positioned within the wheel welts adjacent to the tire 14. Initiator 20 generates a low frequency RF initiator signal and is used to initiate a response from each wheel so that the position of each wheel may be recognized automatically by the pressure monitoring system 12. Initiators 20a-20e are preferably coupled directly to a controller 22. In commercial embodiments where the position programming is done manually, the initiators may be eliminated.

Controller 22 is preferably a microprocessor based controller having a programmable CPU that may be programmed to perform various functions and processes including those set forth herein.

Controller 22 has a memory 26 associated therewith. Memory 26 may be various types of memory including ROM or RAM. Memory 26 is illustrated as a separate component. However, those skilled in the art will recognize controller 22 may have memory 26 therein. Memory 26 is used to store various thresholds, calibrations, tire characteristics, wheel characteristics, serial numbers, conversion factors, temperature probes, spare tire operating parameters, and other values needed in the calculation, calibration and operation of the pressure monitoring system 12. For example, memory may contain a table that includes the sensor identification thereof. Also, the warning statuses of each of the tires may also be stored within the table.

Controller 22 is also coupled to a receiver 28. Although receiver 28 is illustrated as a separate component, receiver 28 may also be included within controller 22. Receiver 28 has an antenna 30 associated therewith. Receiver 30 is used to receive pressure and various information from tire pressure circuits 16a-16e. Controller 22 is also coupled to a plurality of sensors. Such sensors may include a barometric pressure sensor 32, an ambient temperature sensor 34, a distance sensor 36, a speed sensor 38, a brake pedal sensor 41, and an ignition sensor 42. Of course, various other types of sensors may be used. Barometric pressure sensor 32 generates a barometric pressure signal corresponding to the ambient barometric pressure. The barometric pressure may be measured directly, calculated, or inferred from various sensor outputs. The barometric pressure compensation is preferably used but is not required in calculation for determining the pressure within each tire 14. Temperature sensor 34 generates an ambient temperature signal corresponding to the ambient temperature and may be used to generate a temperature profile.

Distance sensor 36 may be one of a variety of sensors or combinations of sensors to determine the distance traveled for the automotive vehicle 10. The distance traveled may merely be obtained from another vehicle system either directly or by monitoring the velocity together with a timer 44 to obtain a rough idea of distance traveled. Speed sensor 38 may be a variety of speed sensing sources commonly used in automotive vehicles such as a two wheel sensor used in anti-lock braking systems, or a transmission sensor.

Timer 44 may also be used to measure various times associated with the process set forth herein. The timer 44, for example, may measure the time the spare tire is stowed, measure a time after an initiator signal or measure the time and duration for transmitting an initiator signal.

Brake pedal sensor 41 may generate a brake-on or brake-off signal indicating that the brake pedal is being depressed or not depressed, respectively. Brake pedal sensor 41 may be useful in various applications such as the programming or calibrating of the pressure monitoring system 12.

Ignition sensor 42 may be one of a variety of types of sensors to determine if the ignition is powered on. When the ignition is on, a run signal may be generated. When the ignition is off, an off signal is generated. A simple ignition switch may act as an ignition sensor 42. Of course, sensing the voltage on a particular control line may also provide an indication of whether the ignition is activated. Preferably, pressure monitoring system 12 may not be powered when the ignition is off. However, in one constructed embodiment, the system receives information about once an hour after the ignition has been turned off.

A telemetric system 46 may be used to communicate various information to and from a central location from a vehicle. For example, the control location may keep track of service intervals and use and inform the vehicle operator service is required.

A counter 48 may also be included in control system 12. Counter 48 may count, for example, the number of times a particular action is performed. For example, counter 48 may be used to count the number of key-off to key-on transitions. Of course, the counting function may be inherent in controller 22.

Controller 22 may also be coupled to a button 50 or plurality of buttons 50 for inputting various information, resetting the controller 22, or various other functions as will be evident to those skilled in the art through the following description.

Controller 22 may also be coupled to an indicator 52. Indicator 52 may include an indicator light or display panel 54, which generates a visual signal, or an audible device 56 such as a speaker or buzzer that generates an audible signal. Indicator 52 may provide some indication as to the operability of the system such as confirming receipt of a signal such as a calibration signal or other commands, warnings, and controls as will be further described below. Indicator may be an LED or LCD panel used to provide commands to the vehicle operator when manual calibrations are performed.

Figure 2:
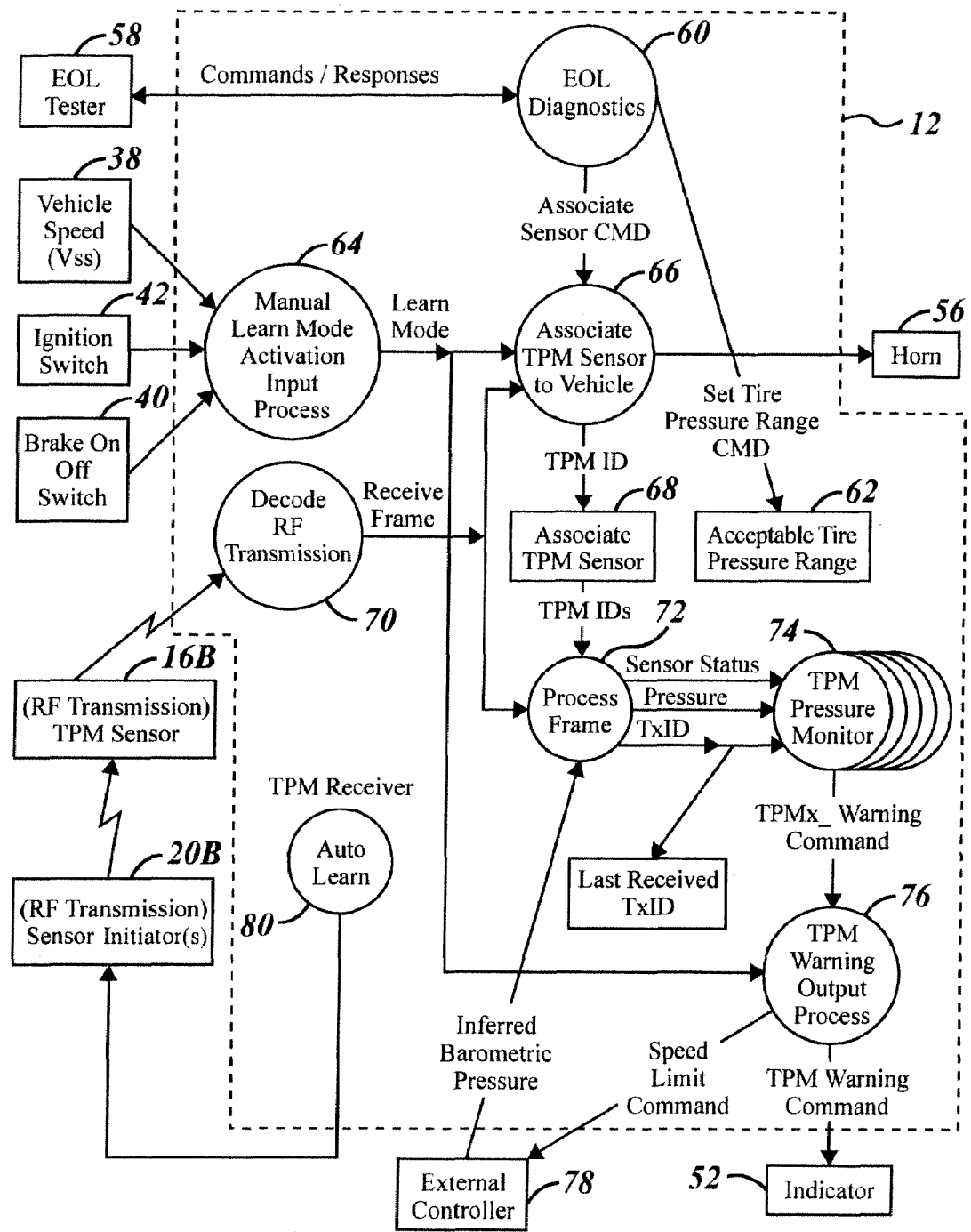
FIG. 2 is a functional flowchart of the monitoring system according to the present invention.

Referring now to FIG. 2, a pressure monitoring system 12 having various functional blocks is illustrated. These functional blocks may take place within receiver 28, controller 22, or a combination thereof. Also, memory 26 is used to store the various ranges. An end-of-line (EOL) tester 58 may also be coupled to pressure monitoring system. EOL tester 58 provides test functions to EOL diagnostic block 60. EOL tester 58 in conjunction with EOL diagnostic block 60 may be used to provide acceptable pressure ranges 62 and other diagnostic functions to determine fault within the system. The EOL tester 58 may be used in the manufacturing process to store various information in the memory such as various thresholds, tire characteristics, and to initially program the locations corresponding to the vehicle tires.

Vehicle speed sensor 38, ignition switch 42, and brake on/off switch 40 may be coupled to a manual learn mode activation input process block 64. Together, block 64 and sensors 38, 40 or 41, and 42 allow an association block 66 to associate the various tire pressure sensors to the locations of the vehicle(s). Block 66 associates the various tire pressure sensors in the memory at block 68. The transmissions from the various sensors are decoded in block 70, which may be performed in receiver 28 above. The decoded information is provided to block 66 and to a block 72, which processes the various information such as the various sensor locations, and the current transmission process. In the processing frame, the sensor status pressure and transmission ID may be linked to a tire pressure monitor (TPM) 74, which may be used to provide a warning status to an output block 76, which in turn may provide information to an external controller 78 and to indicator 52.

An auto learn block 80 may also be used to associate the various tire pressure sensor monitors with the locations of the tires in the vehicle. This process may replace or be in addition to the manual learn block 64. The auto learn function, however, uses initiators such as the initiator 20b as shown. The various features of FIG. 2 will be described further in more detail.

Figure 3:
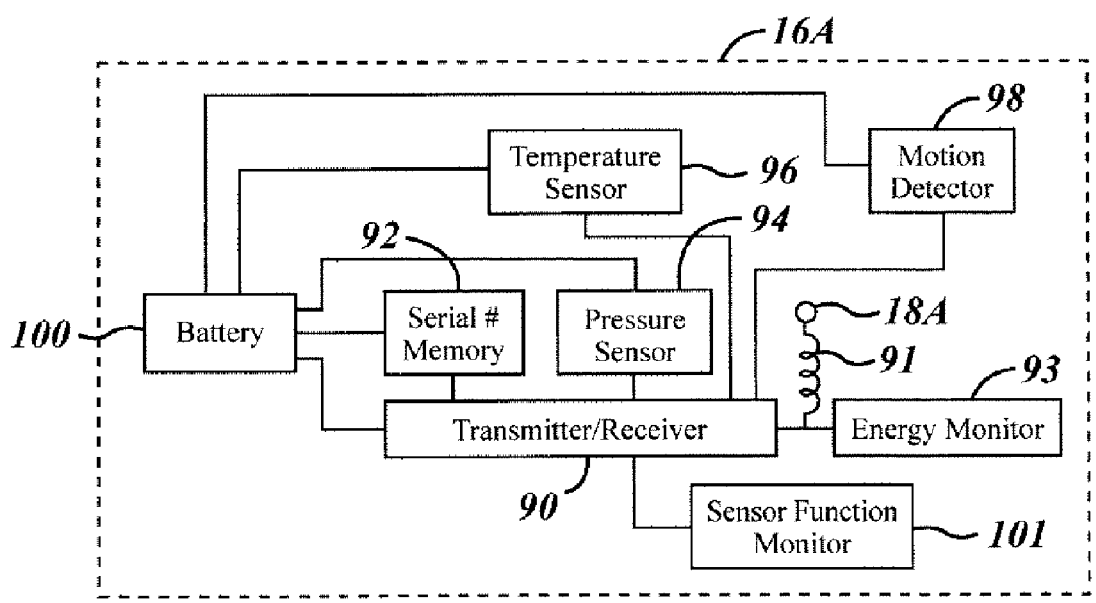
FIG. 3 is a block diagrammatic view of a pressure transmitter according to the present invention.

Referring now to FIG. 3, a typical tire pressure sensor circuit 16a is illustrated. Although only one tire pressure sensor circuit 16a is shown, each of the tire pressure sensor circuits 16a-16e may be commonly configured. Pressure monitoring system 12 has a transmitter/receiver or transceiver 90. Transmitter/receiver 90 is coupled to antenna 18a for transmitting various information to receiver 28. The antenna 18a may, for example, be a coil and thus a sensor coil 91. An energy monitor circuit 93 may be a separate circuit or included in transmitter/receiver 90. The circuit 93 is used to determine an amount of energy in the coil 91. The energy is energy induced from the initiator 20a. The receiver portion of the transmitter/receiver 90 may be used to receive an activation signal from an initiator located at a wheel. The pressure sensor circuit 16a may have various information such as a serial number memory 92, a pressure sensor 94 for determining the pressure within the tire 14a, a temperature sensor 96 for determining the temperature within the tire 14a, and a motion detector 98 which may be used to activate the system pressure sensing system. The initial message is referred to as a "wake" message, meaning the pressure sensing circuit 16a is now activated to send its pressure transmissions and the other data.

Each of the transceiver 90, serial number memory 92, pressure sensor 94, temperature sensor 96, and motion sensor 98 are coupled to battery 100. Battery 100 is preferably a long-life battery capable of lasting through the life of the tire.

A sensor function monitor 101 may also be incorporated into tire pressure sensor circuit 16. Sensor function monitor 101 generates an error signal when various portions of the tire pressure circuit are not operating or are operating incorrectly. Also, sensor function monitor may generate a signal indicating that the circuit 16 is operating normally.

Figure 4:
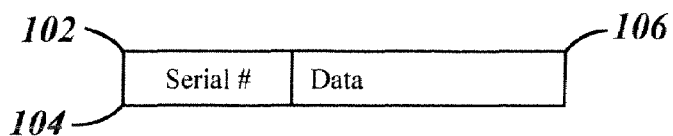
FIG. 4 is a diagrammatic view of a digital word from a pressure transmitter.

Referring now also to FIG. 4, a word 102 generated by the tire pressure sensor circuit 16 of FIG. 3 is illustrated. Word 102 may comprise a transmitter identification serial number portion 104 followed by a data portion 106 in a predetermined format. For example, data section 106 may include a wake or initial status pressure information followed by temperature information. Motion detector 98 may initiate the transmission of the word 102 to the transmitter/receiver 90. The word 102 is preferably such that the decode RF transmission block 70 is able to decode the information and validate the word while providing the identification number or serial number, the pressure, the temperature, and a sensor function.

Figure 5:
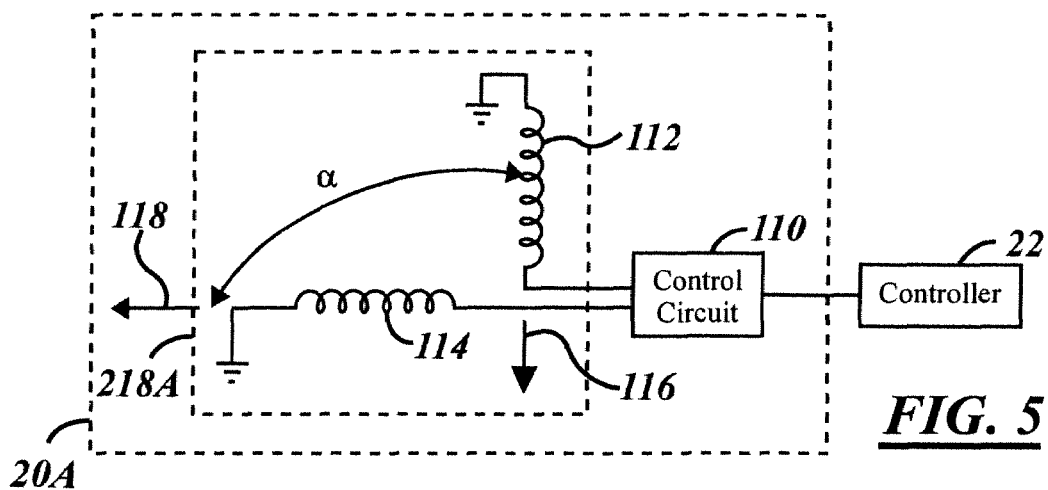
FIG. 5 is a block diagrammatic view of an initiator according to the present invention.

Referring now to FIG. 5, a detailed block diagrammatic view of one of the initiators 20A is illustrated. It should be noted that any one or several of the initiators 20A-20E may be configured in this manner. The initiator 20A is coupled to controller 22 as described above. The initiator 20A may be directly coupled to controller 22 or may include an additional control circuit 110. The control circuit 110 may be a microprocessor-based circuit or simple transistors. The control circuit 110 is coupled to antenna 218A. The antenna 218A may be formed of a first coil 112 and a second coil 114. First coil 112 includes a first axis 116. The second coil 114 has a second axis 118. The axes 116 and 118 of the first coil 112 and the second coil 114 are separated by an angle $\alpha$. The angle $\alpha$ is preferably greater than about 45 degrees and less than 135 degrees. More specifically, the angle $\alpha$ is preferably about 90 degrees, which thus makes the coils 112 and 114 orthogonal. By providing orthogonal (perpendicular) coils, when the wheels are turned, a sufficient amount of energy may be coupled to the sensor 16 associated therewith. It should be noted that control circuit 110 and/or controller 22 may control the coils 112 and 114 simultaneously or sequentially.

Figure 6:
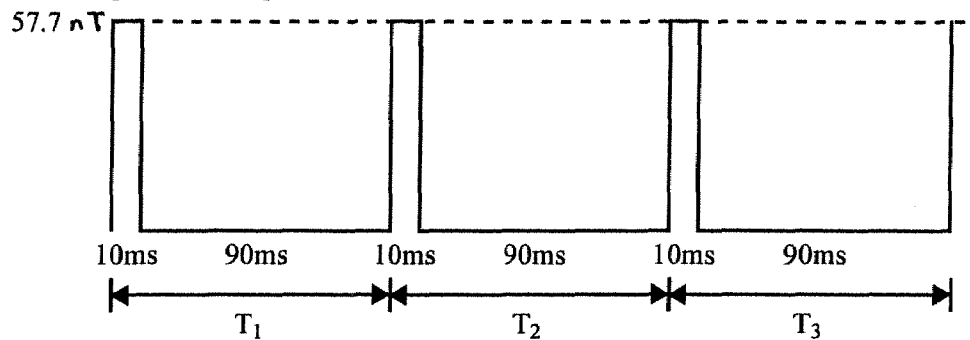
FIG. 6 is time diagram of an operation of an initiator.

Referring now to FIG. 6, the operation of the initiator system will be described. One example of a signal for controlling the initiator coils 112 and 114 is illustrated. In this example, the signal has a duty cycle of 10 percent. That is, the "on" portion of the cycle is on for 10 percent of the total time (T). In this example, the total time T is 100ms, the on time is 10ms, and the off time is 90ms. The signals generated are provided by the controller 22 and/or the control circuit 110. The field strength corresponding to the illustrated signal corresponds to 57.7 nT at 1 meter and thus meets the current FCC guidance for peak strength. It should be noted that the coils 112 and 114 may be activated with the signal simultaneously or may be provided with such signals sequentially.

At the same time to reduce the power consumed by the tire pressure transmitter/receiver circuit 16a, the energy monitor circuit 93 may be periodically used to monitor the presence of an energy field such as a magnetic field in the coil 91. The energy monitoring circuit 93 may use various techniques to determine an amount of energy in the coil 91. For example, the amount of current induced in the coil 91 is indicative of the amount of magnetic energy. Other types of energy sensors would be known to those skilled in the art.

Figure 7:
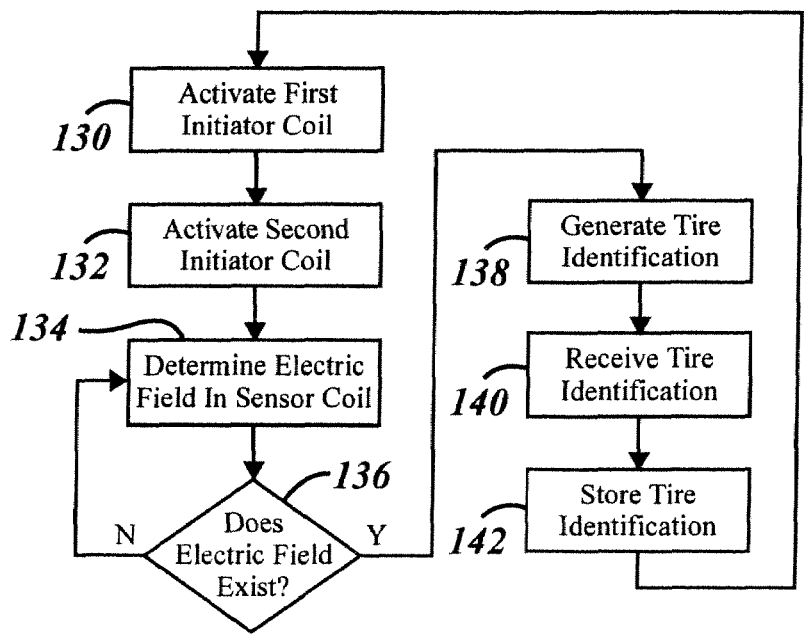
FIG. 7 is a flow chart illustrating a method of operating an initiation method according to the present invention.

Referring now to FIG. 7, one method for operating the present invention is illustrated. In step 130, a first initiator coil 112 is activated. In step 132, a second initiator coil 114 is activated. As mentioned above, the first coil 112 and the second coil 114 may be simultaneously or sequentially activated. In step 134, the sensor 16a determines whether an electric field is present in the sensor coil 91. To determine the electric field in step 134, the voltage may be sampled on the electric coil 91 for a very short period of time. For example, 250ms every 4 seconds. This may be performed continuously or preferably periodically to reduce the amount of energy consumed by the sensor circuit 16a. In step 136, it is determined whether or not an electric field exists. If no electric field exists, step 134 is again executed. In step 136, if an electric field does exist, the tire identification for the sensor 16a is generated (step 138). Of course, other information from the tire pressure sensor 16a may be generated as mentioned above. In step 140, the tire identification is received by the receiver 28 of the tire pressure monitoring system 12. In step 142, the tire identification is stored along with its location so that the tire identification is associated with a particular location of the tire 14a within the vehicle 10. The process continues back to step 130 to repeat the steps so that the plurality of tire identifications are associated with their tire locations. It should be noted that the system 12 may take into account a spare tire 14e which may also include an initiator 20e. It is predicted that the location of the tire 14e may be determined within one minute of operation and certainly within 10 minutes of operation of the vehicle 10.

While particular embodiments of the invention have been shown and described, numerous variations and alternate embodiments will occur to those skilled in the art. Accordingly, it is intended that the invention be limited only in terms of the appended claims.

What is claimed is:

1. A method of operating a tire pressure monitoring system for a vehicle having a plurality of tire locations and a memory, said method comprising the steps of:
   (a) activating and transmitting a first initiator signal from a first initiator positioned at a first tire location of said plurality of tire locations, said first initiator signal being generated from both a first coil having a first longitudinal axis and a second coil having a second longitudinal axis that is substantially orthogonal to said first longitudinal axis, and said first initiator signal having a duty cycle of less than about 50 percent;
   (b) receiving said first initiator signal with a sensor coil;
   (c) periodically detecting the presence of an electric field induced by said first initiator signal on said sensor coil;
   (d) when said electric field is detected and determined to exist, generating and transmitting a first sensor signal having a first tire identification in response to said first initiator signal;
   (e) receiving said first sensor signal with a receiver;
   (f) storing said first tire identification as received in said memory associated with said first tire location of said plurality of tire locations when said first tire identification is not in said memory; and
   (g) repeating steps (a) through (f) similarly for each of said plurality of tire locations.

2. A method as recited in claim 1, wherein said duty cycle is less than about 30 percent.

3. A method as recited in claim 1, wherein said duty cycle is less than about 20 percent.

4. A method as recited in claim 1, wherein said duty cycle is about 10 percent.

5. A method as recited in claim 1, wherein step (a) is at least partially accomplished by activating said first coil simultaneously with said second coil.

6. A method as recited in claim 1, wherein step (a) is at least partially accomplished by activating said first coil sequentially with said second coil.

7. A method as recited in claim 1, wherein the first tire location is a spare tire location.

8. A tire pressure monitoring system for a vehicle, said system comprising:
   a memory;
   a plurality of initiators fixedly attached to said vehicle at a respective plurality of locations, at least one of said initiators including both a first coil having a first longitudinal axis and a second coil having a second longitudinal axis that is substantially orthogonal to said first longitudinal axis;
   a plurality of tires having a respective plurality of circuits that respectively include tire pressure sensors, tire information memories, receivers, sensor coils, energy monitors, and transmitters; and
   a controller coupled to said initiators;
   wherein said controller is operable to activate said initiators, said initiators are operable to transmit initiator signals to both said sensor coils and said receivers of said circuits, said energy monitors are operable to periodically detect the presence of any electric fields induced by said initiator signals on said sensor coils, said transmitters in response to said initiator signals are operable to transmit sensor signals having tire identifications respectively associated with said tires, said controller is operable to receive said sensor signals having said tire identifications, and said controller is operable to store said tire identifications in said memory.

9. A tire pressure monitoring system as recited in claim 8, wherein said first coil is activatable simultaneously with said second coil.

10. A tire pressure monitoring system as recited in claim 8, wherein said first coil is activatable sequentially with said second coil.

11. A tire pressure monitoring system as recited in claim 8, wherein at least one of said initiators is operable to generate an initiator signal having a duty cycle of less than about 50 percent.

12. A tire pressure monitoring system as recited in claim 8, wherein at least one of said initiators is operable to generate an initiator signal having a duty cycle of less than about 30 percent.

13. A tire pressure monitoring system as recited in claim 8, wherein at least one of said initiators is operable to generate an initiator signal having a duty cycle of less than about 20 percent.

14. A tire pressure monitoring system as recited in claim 8, wherein at least one of said initiators is operable to generate an initiator signal having a duty cycle of about 10 percent.

15. A tire pressure monitoring system for a vehicle, said system comprising:
- a memory;
- a plurality of initiators fixedly attached to said vehicle at a respective plurality of locations, said initiators being operable to generate initiator signals each having a duty cycle of less than about 50 percent;
- a plurality of tires having a respective plurality of circuits that respectively include tire pressure sensors, tire information memories, receivers, sensor coils, energy monitors, and transmitters; and
- a controller coupled to said initiators;
- wherein said controller is operable to activate said initiators, said initiators are operable to transmit initiator signals to both said sensor coils and said receivers of said circuits, said energy monitors are operable to periodically sample said sensor coils to detect the presence of any electric fields induced by said initiator signals on said sensor coils, said transmitters in response to said initiator signals are operable to transmit sensor signals having tire identifications respectively associated with said tires, said controller is operable to receive said sensor signals having said tire identifications, and said controller is operable to store said tire identifications in said memory.

16. A tire pressure monitoring system as recited in claim 15, wherein at least one of said initiators includes both a first coil having a first longitudinal axis and a second coil having a second longitudinal axis that is substantially orthogonal to said first longitudinal axis.

17. A tire pressure monitoring system as recited in claim 15, wherein said duty cycle is less than about 30 percent.

18. A tire pressure monitoring system as recited in claim 15, wherein said duty cycle is less than about 20 percent.

19. A tire pressure monitoring system as recited in claim 15, wherein said duty cycle is about 10 percent.

* * * * *